United States Patent [19]
Grob et al.

[11] 4,247,065
[45] Jan. 27, 1981

[54] CARRYING WING WITH MOVING FLAP

[76] Inventors: Burkhart Grob, Wendelsteinstr. 8, 8023 Grosshessolohe; Ernst Gegenhuber, 8022 Grünwald; Ekkehard Bretting, 8941 Ungerhausen, all of Fed. Rep. of Germany

[21] Appl. No.: 7,602

[22] Filed: Jan. 29, 1979

[30] Foreign Application Priority Data

Feb. 1, 1978 [DE] Fed. Rep. of Germany ....... 2804254

[51] Int. Cl.³ .................................................. B64C 3/50
[52] U.S. Cl. .................................. 244/215; 244/219; 16/170; 16/178
[58] Field of Search ............................. 244/213–215, 244/219, 90 R, 207, 272; 16/170, 178

[56] References Cited

U.S. PATENT DOCUMENTS

| 2,233,882 | 3/1941 | Bobek | 16/178 |
| 2,938,680 | 5/1960 | Greene et al. | 244/214 |
| 4,131,253 | 12/1978 | Zapel | 244/215 |

*Primary Examiner*—Galen L. Barefoot
*Attorney, Agent, or Firm*—Holman & Stern

[57] ABSTRACT

A carrying wing having a movable flap, an outer skin of plastics formed continuously without gap from the carrying wing surface to the flap surface, the skin being designed as a thin flexible membrane spanning the transition zone between the carrier wing surface and the flap surface. The skin is secured to the carrier wing surface and to the flap surface at respective positions thereon, and cam guides serve as bearings, which on actuation of the flap, cause the securing position of the membrane on the flap to follow a track which is at least approximately spiral shaped, in order to control the securing position of the membrane on the carrying surface.

5 Claims, 8 Drawing Figures

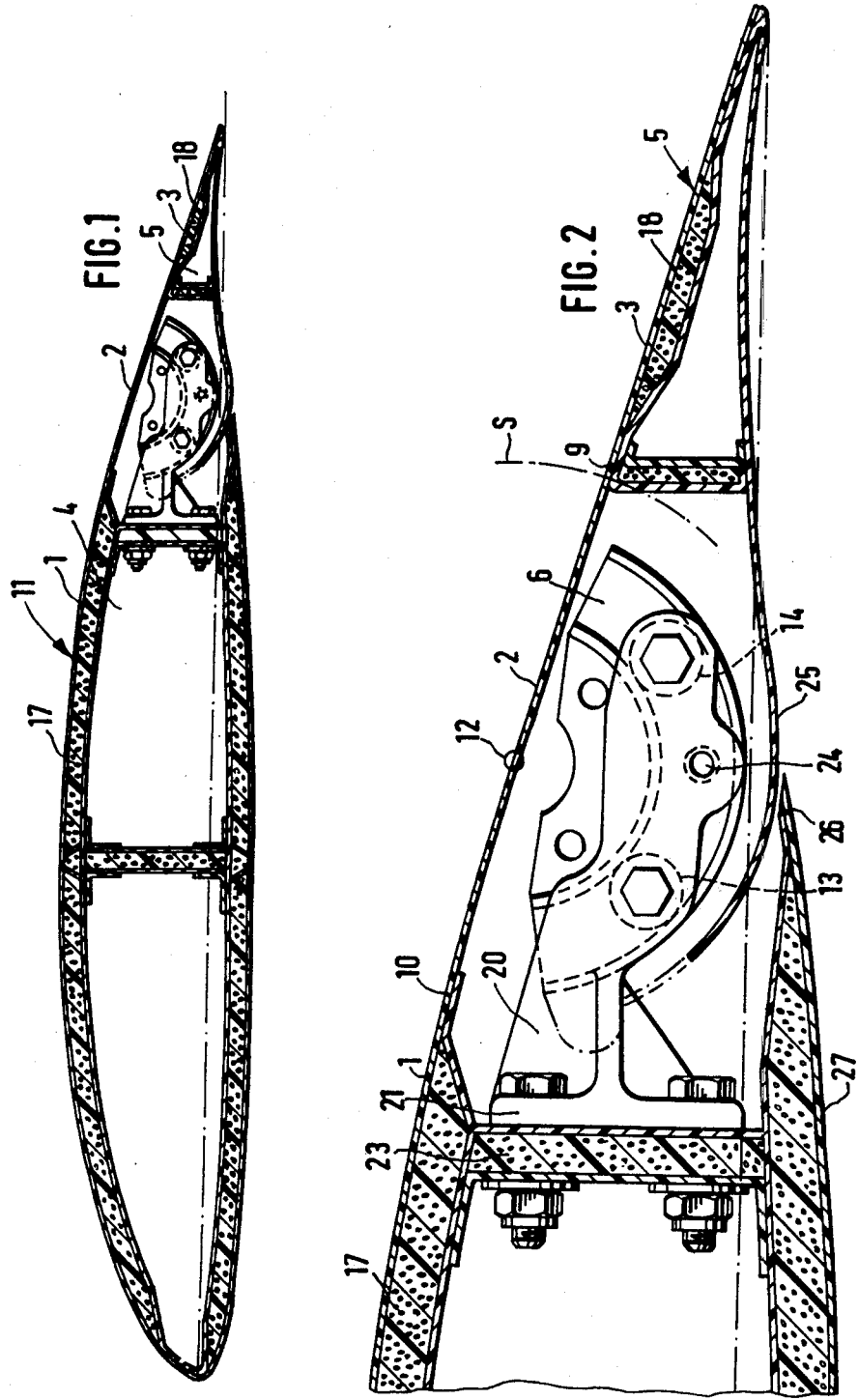

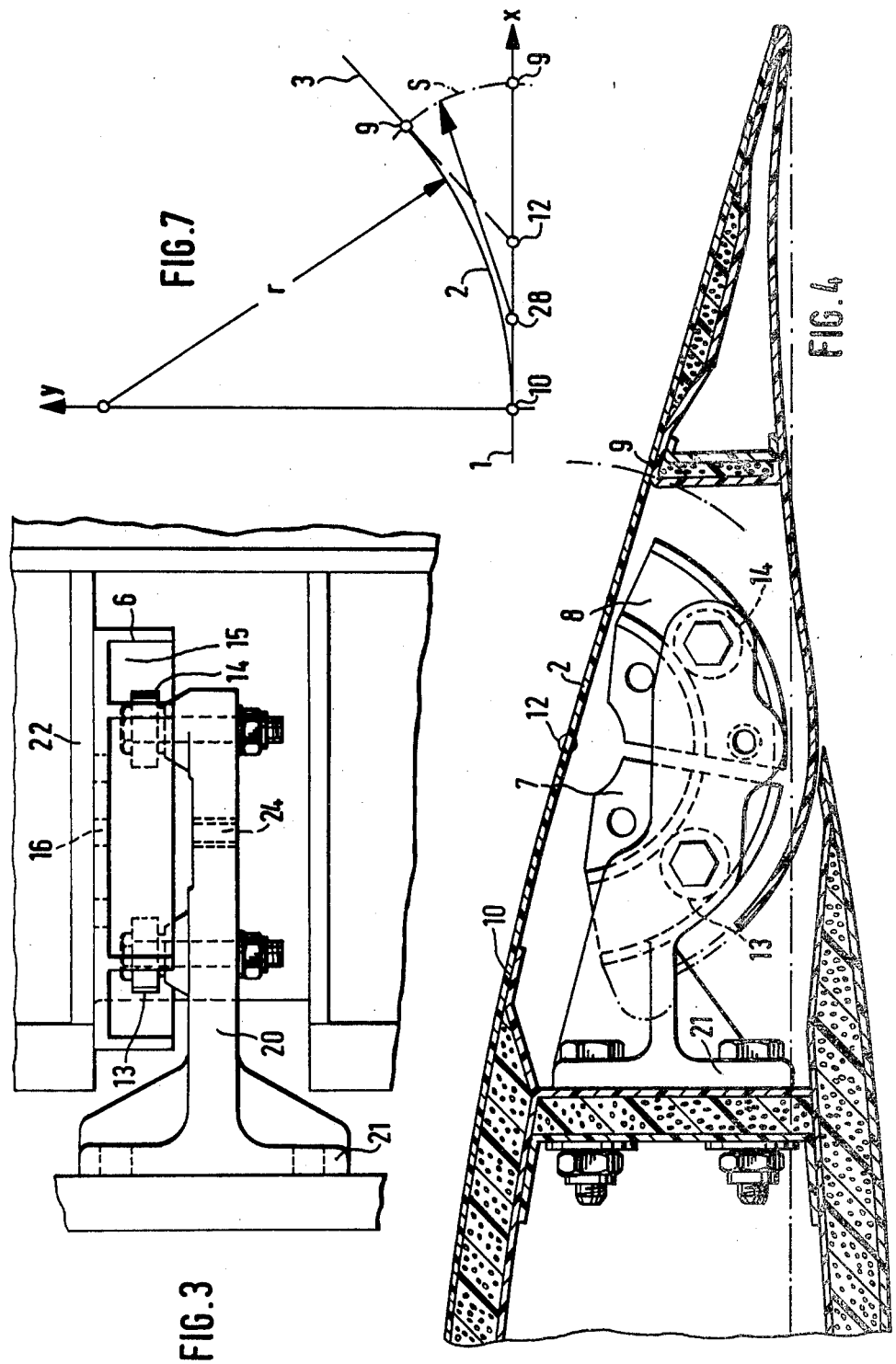

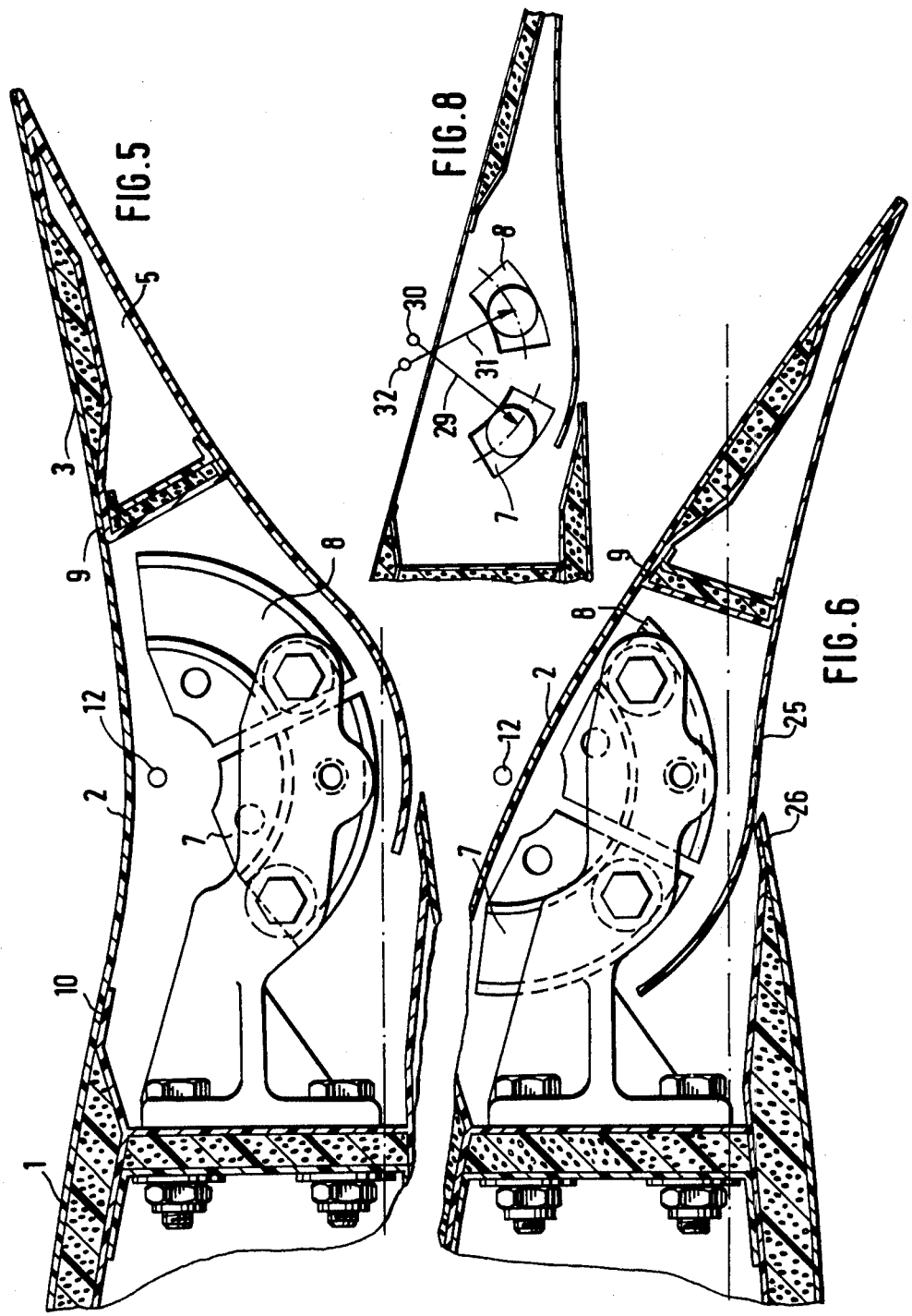

CARRYING WING WITH MOVING FLAP

The invention relates to a carrying wing for example for aircraft with a moving flap retained by a bearing.

The flaps at the end of a carrying wing, which include the aileron or the flap, are generally retained by means of an articulation joint on the carrying wing, allowing the flaps to be directed upwards or downwards.

When actuating the flaps, undesirable curvature occurs in the profile contour at the transition between carrying wing and flap, and this disturbes the air flow. A slot is also provided between the flap and the carrying wing, in order to allow the flap operation with a minimum of friction forces. Random stray air flows occur as a result of the slot between carrying wing and flap, having a prejudicial effect upon the wing forces.

An attempt has already been made to connect a flap with the carrying wing by means of flexibly distorting components. In this manner any gap between the carrying wing and the flap is avoided and the wing configuration is also improved. The results obtained with these flexibly distorting components at the mounting of the flap on the carrying wing are nevertheless still unsatisfactory. It must be noted that in the case of gliders, to which such improvements are mainly made, the easy operation of flaps is an essential requirement. Any additional forces to be applied by the pilot should not arise as a result of improvement of the flap bearing equipment or flap structure. In particular this applies to the aileron. Care must also be taken to ensure that material used has the same life as the articulation arrangement in previous designs.

The object of the invention is to provide a carrying wing with a moving flap retained by a bearing, whereby, on the one hand, a gap between carrying wing and flap is avoided, and on the other hand whereby an undesirable curve in the profile contour is avoided at least on one carrying wing face during actuation of flaps, the arrangement being achieved so that flap actuation requires no greater forces than a normal flap bearing.

According to the present invention there is provided a carrying wing with a moving flap retained by a bearing and an outer skin formed continuously without gap from the carrying wing surface to the flap and designed as a thin flexible membrane spanning the transition zone between the carrier wing surface and the flap, and secured to the carrier wing surface and to the flap surface at respective positions thereon, there being cam guides which serve as bearings, which on actuation of the flap, cause the securing position of the membrane on the flap to follow a track which is at least approximately spiral shaped, in order to control the securing position of the membrane on the carrying surface.

With such an arrangement, when a membrane is located between the carrying wing surface and the flap, it is necessary to control the membrane at both securing positions in such a manner that no compression forces and, where possible, no tensile forces occur. Compression forces acting on the membrane would lend to undesirable curvature thereof the position and nature of such curvature being difficult to control and which would also lead to premature damage to the membrane or to the securing positions. Tensile forces are also prejudicial for the same reason. Moreover, tensile or compression forces would lead particularly to additional resistance in the flap actuation, which is not acceptable. It has been found that when guiding the securing position for the membrane on the flap upon a suitable spiral track, such undesirable compression or tensile forces are eliminated from the membrane, so that the membrane is only subject to bending moments affecting it in the manner of a circle or of a circular arc-like configuration, that is distorting it to form a parabola.

It has also been found that slight variations of the membrane securing positions on the flap from the ideal track are admissible within certain limits, and still yield suitably acceptable results. In this manner it is possible to achieve suitably simple cam guide configurations which can be reproduced in practice.

The foregoing conditions for the securing position track for the membrane on the flap result in ability to hold the membrane with sufficient precision and control at the two securing positions. The membrane may thus be relatively thin, in turn leading to limited distortion forces required to bend the membrane. When actuating the flaps they are of a negligible order.

The arrangement avoids the gap between flap and carrying wing on one face of the wing, preferably the upper face, to which the membrane is fitted. This ensures that uncontrollable air flows are excluded. The slight curve in the wing underside which still occurs on flap actuation, is very greatly reduced in its effects.

It has been found that excellent conditions can be achieved when the cam guides have a rotation or turning axis, arranged in the membrane and approximately in the middle between both securing positions on the flap and on the carrying surface.

This location of the rotation axis is valid for the middle position of the flap. The cam guides allow the theoretical rotation point also to be arranged outside the profile configuration. There are no components in the relevant position, which would only have unfavourable effects once more upon the wing air flow.

Instead of a rotation axis assumed to be at a relatively fixed position in relation to carrying wing surface or the flap, a moving rotation axis can also be provided for travelling according to the flap angle, in order to ensure the best securing position for the membrane on the flap, in accordance with the spiral track required.

It has nevertheless been found that very good results are obtained, when the cam guides have a circular arc shape. As the rotation axis is located approximately between the securing positions, the required spiral track is satisfactorily approximated for the membrane securing position to the flap.

Two guide components engage preferably in each of the cam guides, the cam guides preferably being in the form of channels, within which ball-bearings with a crown-like outer race can engage. The crown like outer contour has the advantage that easy flap operation is maintained even in the event of slight distortion of the carrying wing surfaces.

The construction can be achieved without considerable additional expense, by the use of cam guides consisting of two sections each with a guide component. The track of the one guide component is then determined by one section of the cam guide and the track of the other guide component by the other section. By this means the necessary movements of the axis are easily achieved, though it should be ensured that the need for a spiral track for the securing position is fulfilled towards both sides during the flap deflections. Each section may have the configuration of a circular arc, so that they may be produced for instance by lathe turning.

It is evident that lateral displacement in the direction of securing width of the cam guide sections with the relevant guide components a whole series of tracks can be produced. However, it has been found that it suffices for both sections to be arranged in the same vertical plane, which has the advantage that additional distortion forces are avoided.

Generally it is preferable for the guide components to be secured to the carrying surfaces and the cam guides to the flap, when the reverse procedure is also basically possible.

A considerably facilitated assembly is achieved by using an arrangement for reciprocal securing of the cam guides and of the guide components. The outer skin of the wing, the flap and the membrane can then be made in one operation, as in a wing component without moving flap.

The invention will now be described by way of example with reference to the drawings in which:

FIG. 1 is a section through the carrying wing constructed in accordance with the invention;

FIG. 2 is an enlarged illustration of the main components of the wing according to FIG. 1;

FIG. 3 is a plan view of a detail of the construction;

FIG. 4 is a view of FIG. 2 showing a modified version;

FIGS. 5 and 6 are examples of the design according to FIG. 4 with the flap deflected upwards and downwards, respectively;

FIG. 7 is a diagrammatic representation and

FIG. 8 is a further modified example constructed according to the invention.

The carrying wing 11 shown in FIGS. 1 to 3 is made essentially of plastics and comprises particularly the glass fibre reinforced plastics outer skin 1. At the rear edge is a flap 5 with an outer skin 3. The arrangement is basically suitable for such plastics carrying wings, since the outer skin can also be used to form a membrane 2. Other materials may however be used, the membrane 2 being for example a metal skin.

Within the area of the carrying wing, the outer skin 1 is reinforced such as by a formed filler 17 of the usual form and in the area of the flap 5 the outer skin 3 has a similar reinforcement 18.

The outer skins 1 and 3 and the membrane 2 are preferably applied in a single operation, being secured at positions 9 and 10 to the carrying wing and to the flap respectively.

Where the membrane 2 is to be free from compression or tensile forces, and where any distortion of the membrane 2 is preferably to be uniform in order to eliminate excess stressing of the material as well as to exclude the presence of excessive reaction forces, the membrane 2 should have for instance the form of a circular arc or of a parabola. In the illustration in FIG. 2, the circular arc has a comparably large radius, matching the remaining curvature of the profile of the carrying wing 11. On the other hand when the flap 5 is raised, the shape of the membrane 2 goes from a straight to a curved circular arc shape with the central point at the top, and in ideal conditions the securing position 9 would move along a spiral track or path.

FIG. 7 indicates the shape of the spiral track S, in which the securing position 9 moves relatively to securing position 10. For the purpose of the track of securing position 9 the co-ordinates $x = r \sin \alpha$ $y = r (1 - \cos \alpha)$ are applicable, wherein r is the changing radius of membrane 2 and $\alpha$ is the deflection angle of the flap.

The spiral track S with the usual deflection of the flap may be considered as a very close approximation of a circular arc about central point 28, the said central point 28 dividing the stretch between securing positions 9 and 10 in the approximate ratio of 3:1. The angular position of flap 5 on the other hand, corresponds much more with a pivoting movement of flap 5 about rotation axis 12, which is approximately at the centre between the securing positions 9 and 10.

Slight variations from the circular arc form of the membrane 2 result from a simple immovable rotation axis 12. On the other hand since the maximum flap deflections are limited, such slight variations can be allowed, since the operating conditions for the flap bearing are considerably simplified as a result. As outlined in greater detail in FIG. 8, it is possible by relatively simple means, to achieve an ideal spiral form or a very close approximation thereof.

In the example detailed in FIG. 2 the flap 5 always moves about the central axis 12, in other words the guide has the contour of a circular arc at the central axis 12. To define the guide on which the flap may move there is provided, on the flap, a cam guide 6 which is produced by means of a lathe turned component in which residual unwanted parts are subsequently removed. This is secured to a fin 22 of flap 5, as shown in FIG. 3. The cam guide 6 has a U-shaped channel 15, in which cam components 13 and 14 engage. The guide components 13 and 14 are formed by ball bearings, with a crown like outer shape, to exclude any seizing in the event of any distortion of the carrying wing or of the flap. The cam components 13 and 14 are secured to an arm 20, with a flange 21 secured to a suitable component 23 of the carrying wing.

The arm 20 has a securing bore 24, matching a bore 16 in the cam guide 6 when it is in the central position (FIG. 2). A stud passed through the bores 16 and 24 prevents movement of the flap, so that a rigid wing is obtained when assembling the outer skin from components 1 and 3 with membrane 2. The stud is removed on completion of the assembly.

To accommodate the rotary movement about the rotation axis 12, on the underside, outer skin 25 is formed on the flap underside to operate in conjunction with a lip like end of outer skin section 27 of the carrying wing underside. A seal at this point is of minimal importance. The outer skin 25 on the flap is bowed to smooth out the shape.

The construction shown in FIGS. 4, 5 and 6 has two separate but aligned cam guides 7 and 8 secured to the flap. The cam components 13 and 14 of the FIG. 1 construction, engage in the cam guides 7 and 8 respectively.

FIG. 8 shows a construction with the two cam guides 7 and 8 of the FIGS. 4 to 6 configuration but in which the movement takes place about the axes identified in FIG. 8 at 30 and 32, by means of radials 29 and 31 respectively.

We claim:

1. A carrying wing for an aircraft having a movable flap comprising a main carrying wing, a flap attached to and supported on said main wing in spaced relationship thereto by a bearing means, said main wing and flap each having an outer surface skin, a flexible membrane spanning the space between and being secured at securing positions to said outer surface skins on the top of the wing to form a continuous smooth top surface, an arm supported on said main wing between said main wing and said flap, a cam guide having a U-shaped channel extending in a circular arc supported on said flap, said bearing means being at least two ball bearings having crown-like outer rings supported for rotation in spaced relationship on said arm and engaging in said U-shaped channel to facilitate up and down movement of the flap about a center of rotation located substantially in said membrane midway between said securing positions and movement of said securing positions on said flap to follow a track which is substantially spiral shaped.

2. A carrying wing with flap as claimed in claim 1 in which said guide comprises two sections each having a ball bearing engaging therein.

3. A carrying wing with flap as claimed in claim 2 in which both sections of the cam guide are arranged on the same vertical plane.

4. A wing as claimed in claim 1 wherein said securing positions are substantially along the trailing and forward edges of said main wing and flap respectively, said cam guide is affixed to a forwardly projecting rib of said flap, a lip-like extension on the lower trailing edge of said main wing and the lower outer surface of said flap extends forwardly between said lip-like extension and said cam guide and is curved to move in close spaced relationship to said lip-like extension as the flap moves.

5. A wing as claimed in claim 2 wherein said two cam guide sections have circular arcs with different centers.

* * * * *